(12) United States Patent
Tang et al.

(10) Patent No.: US 6,291,606 B1
(45) Date of Patent: Sep. 18, 2001

(54) HIGHLY STEREOREGULAR POLYACETYLENES FROM ORGANORHODIUM CATALYSTS IN AQUEOUS MEDIA

(75) Inventors: Ben Zhong Tang, Kowloon; Wa Hong Poon, Whampoa Garden, both of (HK)

(73) Assignee: The Hong Kong University of Science and Technology, Hong Kong (HK)

( * ) Notice: Subject to any disclaimer, the term of this patent is extended or adjusted under 35 U.S.C. 154(b) by 0 days.

(21) Appl. No.: 09/292,997

(22) Filed: Apr. 16, 1999

Related U.S. Application Data

(62) Division of application No. 08/821,433, filed on Mar. 21, 1997, now abandoned.

(51) Int. Cl.[7] .............................. C08F 138/02; C08F 4/80
(52) U.S. Cl. .............................. 526/93; 526/91; 526/170; 526/171; 526/285; 526/902
(58) Field of Search .................................... 526/171, 170, 526/285, 902, 93, 91

(56) References Cited

U.S. PATENT DOCUMENTS

| 3,051,693 | 8/1962 | Leto . |
| 3,993,711 | 11/1976 | Watson . |
| 5,373,071 | * 12/1994 | Drent .................................... 526/93 |

FOREIGN PATENT DOCUMENTS

| 0 576 091 | 8/1994 | (EP) . |
| 7-258344 | 8/1995 | (JP) . |

OTHER PUBLICATIONS

A.Furlani et al., J. of Polymer Science :Part A : Polymer Chemistry (1989) 27: 75–86 Jan. 1989.*
U. Kolle et al. Chem. Ber. (1995) 128: 911–917 1995.*
U. Kolle et al., "Olefin Aqua Complexes of Rhodium(I)" *Chem. Ber.* (1995) 128:911–917.

Y. Kishimoto et al., "Living Polymerization of Phenylacetylenes Initiated by $Rh(C=CC_6H_5)(2,5-norbornadiene)[P(C_6H_5)_3]_2$" *J. Am. Chem. Soc.* (1994) 116:12131–12132.
A. Furlani et al., "The Influence of the Ligands on the Catalytic Activity of a Series of $Rh^1$ Complexes in Reactions with Phenylacetylene: Synthesis of Stereoregular Poly(phenyl) Acetylene" *J. of Polymer Science: Part A: Polymer Chemistry* (1989) 27:75–86.
A. Furlani et al., "Stereoregular Polyphenylacetylene" *Polymer Bulletin* (1986) 16:311–317.
J. Lokaj et al., "The Diels–Alder Reaction and Copolymerization of Halogenated N–Phenylmaleimides with Dienes" *Die Angewandte Makromolekulare Chemie* (1986) 144:207–218.
H.–J. Haupt et al., "Preparation and Catalytic Properties of Rhodium(I) Complex Salts of the Type $[Rh(COD)(o-Py(CH_2)_2P(Ph)(CH_2)_3ZR)]PF_6(Z = O, NH)$" *Z. anorg. allg. Chem.* (1993) 619:1209–1213 (with Abstract in English).
M. Tabata et al., "Highly Stereoregular Polymerization of Aromatic Acetylenes by $[Rh(norbornadiene)(Cl]_2$ catalyst" *Chemical Abstracts* (1996) 124:87955r, No. 8 (Abstract only).
R. Vilar et al., "Polymerization of Phenylacetylene with di–μ–=Pentafluorothiophenolate bis(1,5–cyclooctadiene) rhodium (I) and its analogs" *Synthetic High Polymers* (1995) 122:315188j (Abstract only).

* cited by examiner

*Primary Examiner*—Fred Zitomer
(74) *Attorney, Agent, or Firm*—Burns, Doane, Swecker & Mathis, L.L.P.

(57) ABSTRACT

The present invention provides methods for obtaining highly stereoregular polyacetylenes from organorhodium catalysts in aqueous media in high yield. These methods afford substantial advantages in that they are rapid, economical, and utilize environmentally benign solvents. The present invention further provides methods for making thin films of polyphenylacetylenes that are tough and transparent.

15 Claims, No Drawings

HIGHLY STEREOREGULAR POLYACETYLENES FROM ORGANORHODIUM CATALYSTS IN AQUEOUS MEDIA

This application is a divisional of application Ser. No. 08/821,433, filed Mar. 21, 1997 now abandoned.

FIELD OF THE INVENTION

The present invention provides a rapid and low cost method for obtaining highly stereoregular polyacetylenes, particularly poly(phenylacetylenes) (also referred to herein as "PPAs"), from aqueous media.

BACKGROUND

Polyacetylenes are structurally simple polymers having alternating double bonds along the main chain (i.e., $-(CR=CR')_n-$). Polyacetylenes are of interest due to the fact that they often possess the following properties: i) electrical conductivity (semiconductivity), ii) paramagnetism, iii) chain stiffness, iv) geometrical isomerism, and v) color.

Shirakawa and co-workers stimulated interest in polyacetylenes in the 1970 s when they reported a $10^{11}$-fold increase in electrical conductivity of polyacetylene film upon doping. That finding stimulated interest in conjugated polymers. Researchers sought to improve their understanding of such polymers and explored new synthetic routes.

Driven by a vision of doped polymers as versatile, abundant and lightweight "plastic metals", researchers originally focused on increased electrical conductivity. More recently, conjugated polymers have been shown to have a wider range of uses, e.g., non-linear optical waveguides, light-emitting diodes, gas separation membranes, chiral separation membranes, and cell growth media.

Polymerization of substituted acetylenes has been attempted using radical initiators (e.g. 2,2'-azobisisobutyronitrile, ["AIBN"]) and ionic initiators (e.g., n-BuLi). In most cases, however, linear oligomers with low molecular weight (i.e., M.W. of about several thousand) are produced and cyclotrimers are often formed as by-products. Thus, the selective synthesis of polymers having M.W.s higher than about ten thousand proved difficult.

Ziegler-Natta catalysts (typically obtained by mixing an alkyl or aryl of a metal from Group I–IV of the Periodic Table with a compound, commonly a halide, of a transition metal of Group IV–VII) have been used for the polymerization of substituted acetylenes. In fact, prim- or sec-alkylacetylenes yield high molecular weight polymers in the presence of Ziegler-Natta catalysts such as a mixture of iron trisacetylacetonate and triethylaluminum [Fe(acac)$_3$-Et$_3$Al (1:3)]. However, insoluble polymers and/or oligomers are produced from aromatic or heteroatom-containing monosubstituted acetylenes; and no disubstituted acetylenes are known to polymerize with Ziegler-Natta catalysts.

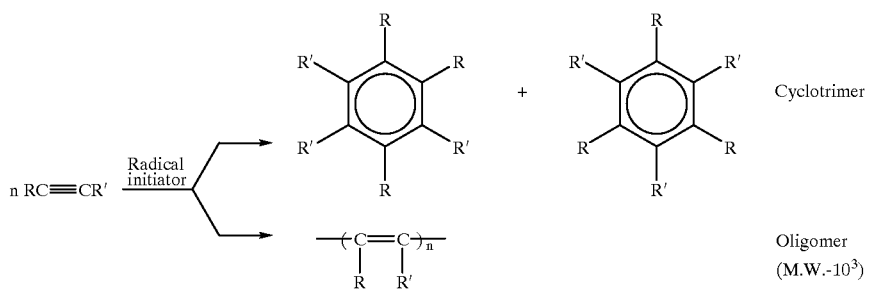

FIG. 1.1 Polymerization of substituted acetylene by radical initiator.

TABLE 1

Polymerization of HC≡CR by Ziegler-Natta catalysts.[a]

| HC≡CR | R | Product |
|---|---|---|
| Aliphatic | Et, n-Bu, sec-Bu | Soluble high polymer |
| Aromatic Heteroatom-containing | (various aromatic and heteroatom-containing substituents shown) | insoluble polymer + oligomer |

[a]RC≡CR': no polymerization.

The results of the polymerization of phenylacetylene (PA) by the use of conventional radical, cationic, anionic and Ziegler-Natta initiators are distinct and are summarized below.

TABLE 2

Polymerization of HC≡CPh by conventional initiators

| Initiator | Example | $M_n$ |
|---|---|---|
| Radical | Heat | 500–2000 |
| Cationic | $AlCl_3$ | 500–1500 |
| Anionic | n-BuLi | ~1000 |
| Ziegler-Natta catalyst | $TiCl_4$-$Et_3$-Al | 400 |
| | $VO(sal)_2$-$Et_3$-Al | 7500[a] |
| | $Fe(acac)_3$-$Et_3Al$ | 4060[a] |

[a]Mostly insoluble

Recently, metathesis catalysts have been used in polymerizing alkynes. The metathesis catalysts polymerize a wider range of monomers. Masuda and co-workers reported that while Ziegler-Natta catalysts can only produce high polymers from sterically undemanding acetylene or n-alkyl terminal alkynes, no soluble high polymer would be produced from alkyl alkynes with a tertiary substituent, aryl alkynes, and disubstituted alkynes. In contrast, Group V and VI metathesis catalysts polymerize more sterically demanding alkynes, such as tert-butylacetylene.

The polymerization of substituted acetylenes initiated by group V, VI and VIII transition metal complexes has also attracted a great deal of attention. In particular, Rh(I) complexes exhibit high reactivity with alkynes and have an ability to effect stereocontrolled polymerization.

A stereoregular polymer, according to the International Union of Pure and Applied Chemistry (IUPAC) definition, is a "macromolecule that can be described in terms of only one species of stereorepeating unit, in a single sequential arrangement." A stereorepeating unit is a configurational unit having a defined configuration at all sites of isomerism in the main chain of a polymer molecule.

Some Rh(I) complexes polymerize PA and its derivatives to achieve highly stereoregular substituted polyacetylenes. These include $[Rh(diene)Cl]_2$, $[Rh(diene)(N—N)]X$, $Rh(cod)$ $[C_5H_4$ $N$-$2$-$(CH_2)_2P(C_6$ $H_5)(CH_2)_3$ $ZR]PF_6$, and $Rh(C_6H_5)(nbd)[P(C_6H_5)_3]_2$, where the term "diene" includes 1,5-cyclooctadiene ("cod") and 2,5-norbornadiene ("nbd"); "N—N" includes nitrogen-based bidentate ligand; "X" includes $PF_6$, $ClO_4$, and $B(C_6H_5)_4$; and "ZR" includes $—OC_2H_5$, $—OC_6H_5$, $—NH(C_6H_5)$, and $—NH$ $(cycloC_6H_{11})$.

Stereoregular PPA and derivatives are considered important as model compounds of ferromagnetic polymers, non-linear optical materials, and oxygen permeable materials where the geometrical structure of the main chain has to be controlled in order to draw useful properties from them.

Configuration of Monosubstituted Polyacetylenes

A monosubstituted polyacetylene can exist in the following four configurations: cis-cisoidal, cis-transoidal, trans-cisoidal and trans-transoidal. PPA also exhibits those four configurations.

Some research groups have studied the identification of these configurations by using IR and NMR. They report that the cis-cisoidal and cis-transoidal configuration can be distinguished from the two trans configurations by the appearance of an absorption peak at 740 cm$^{-1}$ in the IR spectra of the two cis configurations. The cis-transoidal configuration can also be distinguished by the singlet or any multiplicity at δ 5.82 ppm in the $^1$H—NMR spectrum

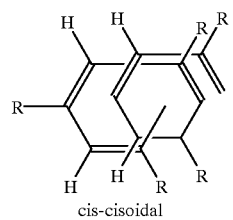

cis-cisoidal

-continued

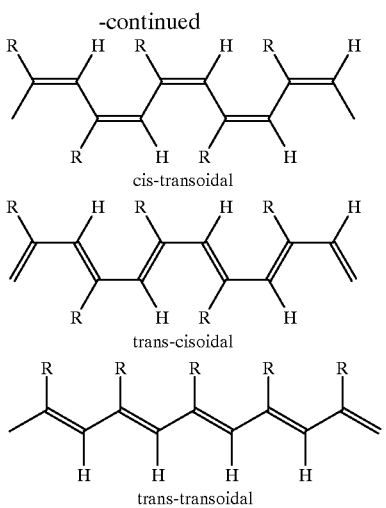

cis-transoidal trans-cisoidal trans-transoidal

Configuration of Monosubstituted Polyacetylenes.

Correlations between Spectral Properties and Chain Structures of PPA

The cis-content can indicate the degree of the stereoregularity of PPA. The higher the cis-content, the higher the stereoregularity of the polymer. Simionescu C. I. & Percec V. analyzed the chain conformation of PPA. They reported that the cis-transoidal species has characteristic signals at δ 5.82 ppm, which is due to the olefinic proton, and two others at δ 6.7 and δ 6.85 ppm; while according to the theoretical calculations, the $^1$H-NMR spectrum of the cis-cisoidal PPA must be different. The olefinic protons of trans-cisoidal and trans-transoidal structure appear at δ 7.0 ppm. $^1$H-NMR spectra of cis-cisoidal species were not reported because of its insolubility.

Since the signal corresponding to the olefin protons (δ 5.82 ppm) of the cis-transoidal structure of PPA is separated from other peaks, the percentage (cis-content) of this cis structure can be calculated from the $^1$H-NMR spectrum according to Eq. 1.

$$\% \ cis = A_{5.82}[10^4/A_t \times 16.66.] \qquad \text{Eq. 1}$$

where:

% cis = cis-content of PPA $A_{5.82}$ = area of the 5.82 ppm signal $A_t$ = total area of the signals in the $^1$H-NMR spectrum The signal at δ 5.82 ppm of the olefin proton, which is characteristic of the cis-transoidal configuration, is useful in calculating cis-content. In each repeating unit, there are six protons (five aromatic protons and one olefin proton). Hence, the above equation can be reconstructed as:

$$\% \ cis = A_{5.82}/A_t(6 \times 100\%)$$

When the polymer is entirely in cis-transoidal configuration, all the olefin protons on the chain give signal at δ 5.82 ppm; and hence it has a % cis value of 100 (i.e., $A_{5.82}/A_t=1/6$). If some olefinic protons are not in cis-transoidal configuration, the ratio of $A_{5.82}/A_t$ decreases; and the % cis value decreases.

However, this equation is only applicable to the cis-transoidal PPA with high stereoregularity. This is because all the peaks broaden if the regularity of the polymer decreases. The peak of olefin protons will overlap with those of the aromatic protons so that the cis-content cannot be calculated accurately from $^1$H-NMR. Cis-contents lower than 70% cannot be determined from the NMR spectrum, due to the overlapping of the olefin and aromatic proton signals.

The cis-content of a cis-transoidal structure of PPA can also be obtained from its IR spectrum. Kern suggested that a planar cis-transoidal chain of PPA reveals a strong interaction between the hydrogen atom of a repeat unit and the phenyl protons two repeat units is away. That interaction is responsible for the infrared band at 740 cm$^{-1}$, which disappears when the interaction is reduced by rotation of the repeat units around the single bonds and by formation of cis-cisoidal helicoidal chain.

Moreover, the intensity of the absorbance of another characteristic peak at 760 cm$^{-1}$ should be constant (C-H out of plane deformation vibration from monosubstituted benzene ring) and the cis-content of cis-transoidal structure of PPA is related to the ratio of the intensity of the peaks at 740 and 760 cm$^{-1}$.

Simionescu and co-workers suggested correlating $A_{760}/A_{740}$ of the IR spectra with the cis-content determinated by NMR. The $A_{760}/A_{740}$ ratio calculation permits the determination of cis-contents between 100 and 40 for the PPA. The lowest limit of cis-content that can be determined from this plot is about 40% because the polymer will then exhibit no band at 740 cm$^{-1}$.

By the above analysis, the structure of PPAs prepared by Rh(I) complexes can be identified and most of them have cis-transoidal configuration as tabulated below:

TABLE 3

Polymerization of Pa by various catalysts.

| No. | Catalyst | Solvent | Yield (%) | Cis-content[a] |
|---|---|---|---|---|
| 1 | [Rh(nbd)Cl]$_2$ | TEA | 100 | 100 |
| 2 | [Rh(cod)Cl]$_2$ | Ethanol | 54 | 100 |
| 3 | [Rh(cod)Cl]$_2$ | Benzene/NaOH | 93 | 85.9 |
| 4 | [Rh(cod)Cl]$_2$tmeda | Benzene/NaOH | 79 | 69.0 |
| 5 | [Rh(cod)Phen]PF$_6$ | Bulk | 70 | 96.7 |
| 6 | [Rh(cod)BiPy]PF$_6$ | Methanol | 65 | 98.5 |

Despite Shirakawa's discovery, and the widespread interest in the materials properties of conjugated polymers, polyacetylene has not yet evolved to a commercial polymer. Polymerizations of phenylacetylene and derivatives have been performed in organic solvents. This increases production costs and environmental concerns.

SUMMARY OF THE INVENTION

The present invention is directed to new methods for synthesizing polyacetylenes, particularly mono-substituted polyacetylenes, and more particularly polyphenyl acetylenes. The method affords the rapid synthesis of highly stereoregular polyacetylenes in high yield. For example, some of the methods of the present invention afford polyacetylenes with complete stereoregularity (e.g., 100% cis-content) in yields exceeding 80 with reaction times of one hour or less. The present invention affords the further advantages of low cost and ease of use in that it avails the use of environmentally benign solvents, and the reactions can be performed in air.

Preferred among the methods of the present invention is the reaction of a mono-substituted acetylenic monomer with a rhodium complex in a polar solvent mixture. Preferred polar solvents are water, alcohols, tetrahydrofuran (THF), triethylamine (TEA), dimethyl formamide (DMF) and mixtures thereof. By alcohols, we mean alcohols having sixteen carbons or fewer; preferably, six carbons or fewer; and still more preferred, three carbons or fewer. An especially preferred alcohol is methanol. A particularly preferred embodiment involves using water in a single solvent reaction mixture.

Alternatively, the reaction might be conducted in a toluene-based solvent system with polar solvents added. Preferred polar solvents are water, alcohols, THF, triethylamine and DMF. An especially preferred alcohol is methanol.

Preferred mono-substituted acetylenic monomers are phenylacetylenic monomers. By phenylacetylenic we mean acetylene bearing a phenyl or substituted phenyl group. Phenyl substituents can be carbon-, silicon-, nitrogen-, oxygen-, or sulfur-containing groups. Preferred carbon-containing substituents are those of 10 carbons or fewer. Especially preferred mono-substituted acetylenic monomers for use in the methods of the present invention are phenylacetylene and para-methylphenylacetylene.

Catalysts useful in the present invention are rhodium catalysts complexed with a diene ligand such as 1,5-cyclooctadiene and 2,5-norbornadiene. For example, catalysts of the type: Rh(diene)X; Rh(diene)R($H_2O$); Rh(diene)NR; and Rh(diene)NR—X are useful in the present invention. In the foregoing, X is a halogen; R is an alkyl, aryl, or acyl substituent of twenty carbons or fewer; and NR is an ammonia or substituted ammonia ligand. The "R" of "NR" is either two or three substituents, which can be the same or different; is as defined above, and further includes H and the remainder of a nitrogen-containing heterocycle (i.e., where the N is the heteroatom of the heterocycle).

A preferred R group in the Rh(diene)R($H_2O$) type catalyst is tosyl (i.e., the para-toluenesulfonate anion, also referred to herein as "tos").

Exemplary rhodium catalyst complexes useful in the present invention are those selected from the group consisting of Rh(nbd)(tos)($H_2O$); Rh(cod)(tos)($H_2O$); [Rh(nbd)Cl]$_2$; [Rh(cod)Cl]$_2$; Rh(cod)(bis(4-t-butyl)-2-pyridylmethylthiolate); Rh(cod)(piperidine)Cl; Rh(cod)($NH_3$)Cl; Rh(cod)(t-Bu$NH_3$)Cl; Rh(cod)(N-methylimidazole)Cl; [Rh(cod)(N-methylimidazole)$_2$]$^+$PF$_6$—; and [Rh(cod)Cl]$_2$ (ortho-phenylenediamine).

Preferred are the [Rh(nbd)Cl]$_2$ and [Rh(cod)Cl]$_2$ catalysts. Especially preferred are the water soluble rhodium catalysts, Rh(nbd)(tos)($H_2O$) and Rh(cod)(tos)($H_2O$). Use of the latter catalyst has enabled us to produce PPAs having about 100% cis-content in about 80% yield or better in air in as little as one hour.

Thus, the methods of the present invention afford a method for forming highly stereoregular polyacetylenes comprising combining in an aqueous solvent: a rhodium complex selected from the group consisting of Rh(nbd)(tos)($H_2O$); Rh(cod)(tos)($H_2O$); [Rh(nbd)Cl]$_2$; [Rh(cod)Cl]$_2$; Rh(cod)(bis(4-t-butyl)-2-pyridylmethylthiolate); Rh(cod)(piperidine)Cl; Rh(cod)($NH_3$)Cl; Rh(cod)(t-BU$NH_3$)Cl; Rh(cod)(N-methylimidazole)Cl; [Rh(cod)(N-methylimidazole)$_2$]$^+$PF$_6$—; and [Rh(cod)Cl]$_2$ (ortho-phenylenediamine); and a mono-substituted acetylenic monomer selected from the group consisting of phenylacetylene and para-methylphenylacetylene.

THE INVENTION

Phenylacetylene Polymerization Using Rh-Complexes

The use of rhodium complexes as catalysts for PA polymerizations is not new. Furlani et al. found that the catalytic behavior of different rhodium complexes were influenced in the presence of NaOH. For example, Furlani et al. reported that in the presence of NaOH, the [Rh(cod)bipy]PF$_6$ complex gives PPA of high cis content in high yield in only three hours; whereas in the absence of NaOH the complex is inactive. Likewise, the [Rh(cod)bipy]ClO$_4$ complex produces a very high yield of PPA in the presence of NaOH.

We studied the catalytic behavior of five rhodium complexes, RhCl$_3$·3$H_2O$, Rh(PPh$_3$)$_3$Cl, [Rh(nbd)(PMe$_3$)$_3$]PF$_6$, [Rh(nbd)Cl]$_2$ and [Rh(cod)Cl]$_2$; and the use of NaOH as co-catalyst in the polymerization of PA in aqueous medium. The results obtained are summarized below.

Not all the rhodium complexes are water soluble; some must be suspended in water. Distilled deionized water was used to prevent contamination of the reactions by impurities present in water such as MgSO$_4$. In addition, PA monomer was purified by distillation to achieve higher yield and greater M.W.

TABLE 4

Aqueous polymerization of phenylacetylene by Rh-complexes[a]

| No. | Complex | Additive | Time (h) | Polymer[b] |
|---|---|---|---|---|
| 1 | RhCl$_3$·3$H_2O$ |  | 20 | x |
| 2 | RhCl$_3$·3$H_2O$ | NaOH | 21 | x |
| 3 | Rh(PPh$_3$)$_3$Cl |  | 19 | x |
| 4 | Rh(PPh$_3$)$_3$Cl | NaOH | 19 | x |
| 5 | [Rh(nbd)(PMe$_3$)$_3$]PF$_6$ |  | 19 | x |
| 6 | [Rh(nbd)(PMe$_3$)$_3$]PF$_6$ | NaOH | 22 | o |
| 7 | [Rh(nbd)Cl]2 |  | 2.1 | o |
| 8 | [Rh(cod)Cl]2 |  | 21 | o |

[a]Reacted in water under nitrogen at room temperature, [M]$_o$ = 1M, [complex] = [additive] 1 mM.
[b]x = no polymer obtained; o = polymer formed.

RhCl$_3$·3$H_2O$ is the common starting material for preparing different rhodium complexes. However, the catalytic activity of this complex is not as good as the modified complexes in many acetylene polymerizations. It is rare that RhCl$_3$·3$H_2O$ alone can polymerize acetylene as Rh(III) is not the active species for acetylene polymerization. Therefore, it is not surprising that RhCl$_3$·3$H_2O$ cannot polymerize PA even in the presence of NaOH.

The Daniel-type catalyst, Rh(Ph$_3$P)Cl, as reported by Kern et al. can polymerize PA in bulk condition. However, no polymer was obtained by this complex in aqueous medium with or without NaOH. This suggests that the catalytic activity of rhodium complexes in aqueous media might be different from that in organic media.

The [Rh(nbd)(PMe$_3$)$_3$]PF$_6$ complex was used in salt form. No polymer was obtained in aqueous media unless NaOH was added. This suggests that NaOH is sometimes a required co-catalyst in rhodium catalyzed acetylene polymerization.

Finally, two common rhodium complexes, [Rh(cod)Cl]$_2$ and [Rh(nbd)Cl]$_2$, were used for PA polymerization. Even in the absence of NaOH, both gave rapid, high yield of polymer.

Solvent Effect on Polymerizations of Phenylacetylenes Catalyzed by [Rh(nbd)Cl]$_2$ and [Rh(cod)Cl]$_2$ As [Rh(nbd)Cl]$_2$ can polymerize PA in both organic and aqueous media, the reactivity of this complex with PA and p-(methylphenyl)acetylene (p-MePA) in different reaction media, namely THF, toluene, and water was studied. The results are summarized below.

TABLE 5

Solvent effect on polymerizations of phenylacetylenes catalyzed by [Rh(nbd)Cl]$_2$.[a]

| No. | Solvent | Time (h) | Yield %( | ) $M_w$[b] | $M_2/M_n$[b] |
|---|---|---|---|---|---|
| | | monomer PhC≡CH | | | |
| 1 | Toluene | 1 | 1.1 | 17,200 | 2.8 |
| 2 | THF | 1 | 16.4 | 62,900 | 5.5 |
| 3 | H$_2$O | 0.5 | 58.4[c] | — | — |
| | | monomer p-MePhC≡CH | | | |
| 4 | Toluene | 1 | 0 | — | — |
| 5 | THF | 1 | 29.2 | 17,500 | 3.2 |
| 6 | H$_2$O | 0.25 | 59.0[d] | 22,600[e] | 3.2[e] |

[a]Polymerized under nitrogen at room temperature for 1 h. For phenylacetylene system, [M]$_o$ = 0.83M, [cat.] = 0.79 mM for p = methylphenylacetylene system, [M]$_o$ = 0.58 M, [cat.] = 0.80 mM.
[b]Determined by GPC on the basis of a polystyrene calibration.
[c]Insoluble in THF.
[d]THF-soluble part: 2%.
[e]For the THF-soluble part.

The reaction rates of the polymerization of both PA and p-MePA in aqueous medium were fast and polymers were formed in a short period of time. Red PPA with 58.4% yield could be obtained within half an hour with the catalyst [Rh(nbd)Cl]$_2$; the polymer is insoluble in THF. The insolubility of this polymer might be due to the crystalline properties of the polymer. This also accounts for the red color of the sparingly soluble p-MePA obtained with a yield of 59% under the same reaction conditions.

With THF and toluene as solvent, the yields of both PPA and p-MePA were much lower than those from aqueous medium and both were soluble in THF. From our results, the yield of the yellow PPA formed (16.4%) in THF was lower than that reported in literature. This might be attributed to the much shorter time for polymerization in the former case so that the conversion of PA was low. On the other hand, the higher M.W. (62,900) might be due to the lower concentration of catalyst used, i.e., higher mono./cat. ratio.

The higher reactivity of p-MePA than PA can be observed by the higher yield (29.2%) of P(p-MePA) obtained. In a medium of toluene, the yield of the polymers prepared was even lower being 1.1 k and ~0% for PPA and P(p-MePA) respectively.

In summary, polymerization rates of PA and p-MePA as a function of solvent is as follows: H$_2$O>THF>toluene. Moreover, the polymers prepared in THF and toluene are orange in color and soluble in THF and the configuration of the polymers were determined to be cis-transoidal from the IR spectra.

Various solvents have also been tried for the polymerization of phenylacetylene catalyzed by (Rh(cod)Cl)$_2$. In each case, the time of polymerization was increased to 24 hours to account for lower reaction rates in organic media from previous studies. Reasonable yields had been obtained by this change and the details are shown below.

TABLE 6

Solvent effect on polymerization of phenylacetylene catalyzed by [Rh(cod)Cl]$_2$.[a]

| | | Yield | Polymer | | cis- |
|---|---|---|---|---|---|
| No. | Solvent | % | Mw[b] | Mw/Mn | content[c] |
| 1 | Et$_2$O | 45.8 | 4,200 | 3.6 | 68.5 |
| 2 | Neat | 61.7 | 5,000 | 3.7 | 66.8 |
| 3 | H$_2$O[d] | 68.3 | 46,200 | 2.2 | 94.0 |
| 4 | THF[e] | 69.1 | 13,000 | 5.6 | 81.3 |
| 5 | Et$_3$N | 92.4 | 12,500 | 4.2 | 79.7 |
| 6 | Toluene/H$_2$O[f] | 76.6 | 48,100 | 2.7 | 92.7 |
| 7 | Toluene/MeOH[f] | 82.3 | 53,000 | 3.7 | 89.0 |
| 8 | Toluene/Et$_3$N[f] | 100.0 | 87.000 | 2.2 | 98.4 |

[a]Polymerized under nitrogen at room temperature for 24 h; [M]$_o$ = 0.83 M, [cat.] = 0.74 M.
[b]Determined by GPC on the basis of a polystyrene calibration.
[c]Determined by $^1$H-NMR according to Eq. 1.
[d]Polymerized for 0.5 h.
[3]Literature data: yield 64%; MW 35,000, cis-content 73%.
[f]Polymerized for 0.5 h. volume ratio: 5:0.1.

For PA polymerization in water, the reaction was substantially complete in as little as one half hour. The yield of the polymerization by [Rh(cod)Cl]$_2$ is higher (68.3%) than that by [Rh(nbd)Cl]$_2$ (58.4%). Also the PPA prepared by the former is orange and soluble in THF, while that prepared in the latter case is THF-insoluble.

In addition to water, we studied three organic solvents. Triethylamine ("TEA") produced PPA in high yield, i.e., 92.4%. The exceptionally high yield might be explained by the mechanism proposed by Tabata et. al. who suggested that [Rh(cod)Cl]$_2$ and [Rh(nbd)Cl]$_2$ undergo the following dissociation to a monomeric species in triethylamine (TEA), which stabilizes the dissociated species.

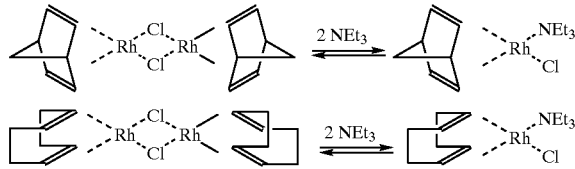

Even after monomer addition to the TEA solution containing the catalyst, no change in the chemical shift of the ligand molecule protons was appreciably detected. This suggests that the coordination of the nbd to the Rh was retained during polymerization even after the monomer addition. The resulting monomeric species might have played an important role as the propagation species in this polymerization.

The yield (92.4%) of PPA obtained by [Rh(cod)Cl]$_2$ in TEA was much higher than that in other solvents (45.8%–69.1%).

Since TEA can enhance the reactivity of Rh complex, toluene was re-considered as the polymerization solvent with some polar additives, e.g., H$_2$O, MeOH and TEA. In all cases, high yields (76.6%–100%) of soluble polymers were obtained. In these systems, both the M.W. (48,100–87,000) and the cis content (89%–98.4%) of these polymers are higher than those prepared in single solvents (M.W. 4,200–46,200; cis content 66.8%–94%).

Although the M.W. (46,200) and the cis content (94%) of PPA prepared in aqueous media are not the highest, it produced the best results among the single solvent systems.

Therefore, it is worthwhile to further study the polymerization of phenylacetylene in water.

Phenylacetylene Polymerization by [Rh(cod)Cl]$_2$ in Aqueous Media With Chemical Additives As NaOH has been proved to be a cocatalyst for the polymerization of phenylacetylene in water, other water soluble compounds were also tried as additives and the results are summarized below.

TABLE 7

Phenylacetylene polymerization by [Rh(cod)Cl]$_2$
In Aqueous Media With Chemical Additives[a]

| No. | Chemical additive[b] | time | Polymer Yield (%) | Mw[c] | Mw/M$_n$ | cis content (%)[d] |
|---|---|---|---|---|---|---|
| 1 | (CO$_2$H)$_2$ | 6.5 | 69.1 | 19300 | 1.4 | 66.8 |
| 2 | FeCl$_3$ | 6.4 | 46.8 | 28400 | 1.7 | 67.9 |
| 3 | NaHCO$_3$ | 4.6 | 64.4 | 20700 | 1.6 | 70.5 |
| 4 | K$_2$CO$_3$ | 6.8 | 65.9 | 23400 | 1.5 | 70.7 |
| 5 | CaCl$_2$ | 6.3 | 57.3 | 28100 | 1.7 | 70.9 |
| 6 | Na$_2$SO$_4$ | 4.0 | 58.3 | 28400 | 1.6 | 74.0 |
| 7 | MgSO$_4$ | 3.7 | 46.2 | 29800 | 1.8 | 82.3 |
| 8 | NaCl | 3.5 | 50.9 | 34700 | 2.0 | 84.4 |
| 9 | o-C$_6$H$_4$-(CO$_2$H)$_2$ | 3.0 | 95.4 | 28500 | 1.7 | 94.0 |

[a]Polymerized under nitrogen at room temperature; [M]$_o$ = 0.83 M, [cat.] = 0.74 mm.
[b]Molar ratio to catalyst: 5:1.
[c]Determined by GPC on the basis of a polystyrene calibration.
[d]Determined by $^1$HMR according to Eq. 1.

All the reaction systems gave high molecular weight polymers with narrow molecular weight distribution. When phthalic acid was used, a stereoregular (94% cis) PPA with narrow molecular weight distribution (M$_w$/M$_n$) was obtained in high yield (95.4%).

Phenylacetylene Polymerization With Rh-complexes Having Nitrogen-Containing Ligands in Aqueous Media Since triethylamine enhanced the reactivity of Rh-complexes in acetylene polymerization, we investigated the use of Rh-complexes having nitrogen-containing ligands. The results are summarized below.

TABLE 8

Phemylacetylene Polymerization In Aqueous Media
With Rh-complexes Having Nitrogen-Containing Ligands[a]

| No. | Catalyst[b] | time (h) | Polymer Yield (%) | Mw[c] | Mw/Mn[c] | cis content (%)[d] |
|---|---|---|---|---|---|---|
| 1 | Rh(cod)(NH$_3$)Cl | 0.25 | 76.8 | 23,300 | 1.8 | 86.4 |
| 2 | Rh(cod)(t-BuNH$_2$)Cl | 0.25 | 57.0 | 6,500 | 2.2 | 87.4 |
| 3 | Rh(cod)(pip)Cl | 0.25 | 71.7 | 7,600 | 2.0 | 86.0 |
| 4 | Rh(cod)(mid)Cl | 1.50 | 75.3 | 12,500 | 2.0 | 87.4 |
| 5 | [Rh(cod)(mid)$_2$]PF$_6$ | 0.75 | 98.2 | 9,900 | 2.0 | 87.5 |
| 6 | [Rh(cod)Cl]$_2$(pda) | 1.67 | 38.5 | 7,300 | 1.4 | 89.8 |
| 7 | Rh(cod)(t-BuL-NS) | 19.5 | 63.2 | 11,400 | 2.2 | 83.2 |

[a]Polymerized under nitrogen at room temperature in water (5 mL) using 0.5 mL monomer and 2 mg catalyst.
[b]pip = piperidine; mid = N-methylimidazole; pda = o-phenylenediamine; t-buL-NS = bis(4-t-butyl)-2-pyridylmethylthiolate.
[c]Determined by GPC on the basis of a polystyrene calibration.
[d]Determined by $^1$H-NMR according to Eq. 1.

The yield of poly(phenylacetylene)(38.5%–63.2%) prepared by Rh(cod(t-BuNH$_2$)Cl, [Rh(cod)Cll$_2$(pda) and Rh(cod)(t-BuL-NS), are lower than that prepared by (Rh(cod)Cl]$_2$ (68.2%); while other catalysts, e.g., [Rh(cod)(NH$_3$)Cl], Rh(cod)(pip)Cl, Rh(cod)(mid)Cl improve the yield of PPA (71.7%–76.8%). The [Rh(cod)(mid)$_2$]PF$_6$ complex produced particularly high yield of PPA.

In conclusion, Rh complexes with nitrogen containing ligands give PPAs having a wide range of yield and M.W., but consistently high cis content.

Aqueous Polymerization of Substituted Acetylenes Catalyzed by Rh(cod)(H$_2$O)tos In the previous polymerizations, the catalysts were suspended in water. This is less than optimal as the size of the Rh complex in water might affect the result of polymerization. A water soluble Rh complex is preferred. We used a diene-containing water-soluble Rh complex, such as Rh(cod)(H$_2$O)tos, to polymerize PA and p-MePA in water. This complex might polymerize different monomers, e.g., water soluble acetylene compounds. The results are summarized below.

TABLE 9

Aqueous Polymerization of
Substituted Acetylenes With Rh(cod)(H$_2$O)tos[a]

| no. | monomer | polymer[b] |
|---|---|---|
| 1 | HC≡CPh | o |
| 2 | HC≡CPh-p-Me | o |
| 3 | HC≡CPh-o-SiMe$_3$ | x |
| 4 | HC≡CSiPh$_3$ | x |
| 5 | HC≡CCH$_2$SO$_2$Ph | x |
| 6 | HC≡C(CH$_2$)$_2$OH | x |
| 7 | HC≡C(CH$_2$)$_3$COOH | x |

[a]Reacted in water under nitrogen at room temperature for 24 h; [M]$_o$ = 1 mM, [cat.] = 1 mM.
[b]o = polymer formed; x = no polymer obtained.

The Rh(cod)(H$_2$O)tos complex gives a yellow solution in water. Brown solid PPAs were observed in a short period of time (several minutes). After about ten minutes, we observed a yellow fine powdery solid suspended in the water. According to Kolle et al., this might be due to the cleavage of the complex in the presence of water to give Rh metal.

The reactivity of the Rh complex decreases or disappears if it stands in water for long time. In fact, the rate of the polymerization decreased significantly after the Rh complex was allowed to stand in water for one day.

Of the acetylenes investigated, only PA and p-MePA were polymerized by this Rh complex; the rest (water is soluble and water insoluble acetylene compounds) produced no isolatable polymer. Thus, hydrocarbon-substituted acetylenic monomers are effectively polymerized in water by water soluble, diene-containing rhodium complexes such as Rh(cod)(H$_2$O)tos.

Phenylacetylene Polymerization with Water-Soluble Rh(cod)(H$_2$O)tos and Rh(nbd)(H$_2$O)tos We have already demonstrated that PA and p-MePA can be polymerized by the water soluble Rh complex, Rh(cod) (H$_2$O)tos. We investigated catalytic reactivity of the water soluble Rh-complexes Rh(cod)(H$_2$O)tos and Rh(nbd)(H$_2$O) tos in the polymerization of PA and p-MePA in THF, toluene and water. The results are summarized below.

TABLE 10

Phenylacetylene Polymerization by Rh(nbd)(tos)(H$_2$O)[a]

| | | | Polymer | | | |
|---|---|---|---|---|---|---|
| No. | Solvent | Time (h) | Yield (%) | $M_w$[b] | $M_w/M_n$[b] | cis content (%)[c] |
| monomer | PhC≡CH | | | | | |
| 1 | Toluene | 1.00 | 1.1 | 30,000 | 3.4 | 86.0[c] |
| 2 | THF | 1.00 | 78.5 | 72,800 | 4.2 | 90.7[c] |
| 3 | H$_2$O | 0.25 | 29.2 | 96,600 | 5.7 | 83.4[c] |
| | H$_2$O | 1 | 80.0 | 216,100 | 2.78 | 89.0[c] |
| monomer: | p-MePhC≡CH | | | | | |
| 4 | Toluene | 1.00 | 1.2 | — | — | — |
| 5 | THF | 1.00 | 67.4 | 54,000 | 3.6 | 90.5[d] |
| 6 | H$_2$O | 0.25 | 31.7[e] | — | — | — |

[a]Polymerized under nitrogen at room temperature. For phenylacetylene system: [M]$_o$ = 0.83 M, [cat.] = 0.98 mM; for p-methylphenylacetylene system: [M]$_o$ = 0.58 M, [cat.] = 0.96 mM.
[b]Determined by GPC on the basis of a polystyrene calibration.
[c]Determined by $^1$H-NMR according to Eq. 1.
[d]Estimated by $^1$H-NMR according to Eq. 2.
[e]THF-soluble part: 0.2%.

The cis content of P(p-MePA) can be calculated by modifying Eq. 1 as follows:

$$\% \text{ cis} = A_{5.79}/A_t * 500 \qquad \text{Eq. 2}$$

where:

$A_{5.79}$ = area of the signal at δ 5.79 ppm $A_t$ = sum of area of the signal at δ 5.79 and aromatic region In this case, the percentage of the cis proton at δ 5.79 ppm is 1/5 of $A_t$ if the cis content is 100%.

The yields of the polymerizations by the water soluble Rh(cod)(H$_2$O)tos and Rh(nbd)(H$_2$O)tos are similar to those by [Rh(nbd)Cl]$_2$ above. The order of reactivity as a function of solvent being: H$_2$O>THF>toluene for both PA and p-MePA. In general, the yields are higher than in the case of [Rh(nbd)Cl]$_2$. In THF we observed an increase in yield of more than 4-fold, and in H$_2$O yield increased by ca. 20%. (Moreover, the PPAs prepared with these water soluble complexes in H$_2$O are THF soluble). In toluene the yields were low.

The PPAs and P(p-MePA)s prepared by these complexes demonstrate both high M.W. and cis content (i.e., 83.4%–100%).

Another advantage of these water-soluble Rh-complexes is that thin polymer membranes or films can be prepared by adding monomer solution to the aqueous catalyst solution in air. For example, thin PPA membranes or films that are tough and transparent (yellow) form within several seconds when monomer solution is added dropwise to the aqueous catalyst solution. The resulting membrane or film can be readily removed from the surface of the aqueous reaction mixture. Alternatively, thin films can be formed by applying monomer to the surface of the aqueous catalyst solution by any acceptable method for introducing discrete quantities of monomer as by spraying, vaporizing, etc.

Traditionally, PPA membranes were prepared by evaporating the solvent of the polymer solution in a container (solution casting). Now, similar, highly stereoregular membrane can be more quickly and easily prepared.

TABLE 11

Polymerization of phenylacetylenes catalyzed by water-soluble Rh (cod) (tos) (H$_2$O) complex[a]

| | | | Polymer | | | |
|---|---|---|---|---|---|---|
| No. | Solvent | Time (h) | Yield (%) | $M_w$[b] | $M_w/M_n$[b] | cis content (%)[c] |
| monomer | PhC≡CH | | | | | |
| 1 | Toluene | 1 | 2.4 | 58,600 | 3.4 | 94.7[c] |
| 2 | THF | 1 | 70.3 | 109,000 | 2.5 | 99.5[c] |
| 3 | H$_2$O | 0.5 | 23.7 | 73,000 | 2.5 | 100.0[c] |
| 4 | H$_2$O | 1 | 81.9 | 31,160 | 4 | 100[c] |
| monomer: | p-MePhC≡CH | | | | | |
| 5 | Toluene | 1 | 0.8 | — | — | — |
| 6 | THF | 1 | 79.8 | 75,900 | 2.3 | 100[d] |
| 7 | H$_2$O | 0.25 | 45.4[e] | — | — | — |

[a]Polymerized under nitrogen at room teperature. For phenylacetylene system: [M]$_o$ = 0.83 M, [cat.] = 0.98 mM; for p-methylphenylacetylene system: [M]o = 0.58 M, [cat.] 0.96 mM.
[b]Determined by GPC on the basis of a polystyrene calibration.
[c]Determined by $^1$H-NMR accordng to Eq. 1.
[d]Estimated by $^1$H-NMR according to Eq. 2.
[e]THF-soluble part: 1.0%.

Structures of Poly(phenylacetylene)s Prepared by Various Catalytic Systems

PPAs of random configuration (e.g. cis-cisoidal, cis-transoidal, trans-transoidal and trans-transoidal structure), demonstrate differing chemical shifts for the olefin as well as aromatic protons in the $^1$H-NMR. The olefinic and aromatic protons of PPA can be seen clearly if the cis content is high. The peaks broaden when stereoregularity decreases; and ultimately, no distinguishable peak appears in polymers with low cis-content.

The stereoregularity of PPAs can also be observed by $^{13}$C-NMR. Sharp peaks are clearly separated in highly stereoregular PPA (100%), while only two broad peaks are observed in PPA with low stereoregularity. Similar sharp peaks of P(p-MePA) of high stereoregularity can be seen in both $^1$H-NMR and $^{13}$C-NMR spectra.

EXPERIMENTAL

A. Solvents

Dry diethyl ether, tetrahydrofuran, toluene were freshly distilled by standard method. Water was purified by simple distillation. AR grade solvents such as acetone, diethyl ether, tetrahydrofuran, ethanol, isopropanol, methylene chloride were used. Technical grade methanol was used to precipitate polymers.

B. Chromatographic Method

1. Thin-layer Chromatography

Analytical thin layer chromatography was conducted on silica gel 60 F$_{254}$ precoated aluminium backed plates (0.2 mm thickness, 20×20 cm, Merck). TLC plates were visualized under ultra-violet light.

2. Adsorption Column Chromatography

Adsorption column chromatography was performed on columns of silica gel 60 (70–230 mesh, Merck) under normal gravity.

C. Purification of Monomers

All the monomers were distilled under nitrogen. The pure fraction of the distilled monomer was stored in small ampules and stored in refrigerator.

D. Determination of Physical Data

1. Gel-permeation Chromatography

All the molecular weight and the distribution of molecular weight of polymer samples were determined by Waters gel-permeation chromatography system #510 which included Waters 510 HPLC pump, Rheodyne 7725i injector with stand kit, 486 tunable uv/VIS detector, 410 refractive index detector, column heater module, system DMM/Scanner with 8 channel scanner option and Waters Styraael GPC columns, HT3, HT4 and HT6 ($10^2$–$10^7$). The temperature of the column heater was 40° C. and THF was used as eluent. All the polymer samples (about 2 mg/mL) were filtered through a 0.45μm PTFE sample filter. In each measurement, 20μL of the sample solution was injected. A universal calibration curve of log (M.W.) against retention time was prepared by using a series of polymer standards. By using the calibration curve, the $M_n$, $M_w$ and the polydispersity index can be obtained.

2. Infrared Absorption Spectrometry

IR absorption spectra were recorded on a Perkin Elmer 16 PC FTIR spectrometer. The samples were prepared in compressed KBr disc form.

3. Nuclear Magnetic Resonance Spectra (NMR)

$^1$H-NMR and $^{13}$C-NMR spectra were recorded on a Brucker ARX 300 NMR spectrometer with $CDCl_3$ as solvent unless otherwise stated. Tetramethylsilane (TMS) (δ 00.0 ppm) or $CHCl_3$ (δ 7.26 ppm) was used as internal reference for $^1$H-NMR, while $CDCl_3$ was used (δ 77.0 ppm) for $^{13}$C-NMR spectra. Chemical shifts were reported in parts per million (ppm) on the δ scale and coupling constant (J) were expressed in Hz. Solvents used for NMR experiments were $CDCl_3$ containing 0.03% TMS, acetone-$d_6$ and THF-$d_8$.

4. Thermogravimetric Analysis (TGA)

All TGA measurements were performed on a Setaram Thermogravimetric Analysis instrument (TTA 92). In each measurement, a sample (4–6 mg) was heated from room temperature to 650° C. at a heating rate of 10° C./min under nitrogen purge of 60 ml/min.

5. Ultraviolet (UV) Absorption Spectrometry

UV spectra were recorded using a Milton Roy Spectronic 3000 Ehode-Array spectrophotometer.

E. Preparation of Catalysts

Unless otherwise specified, preparations were performed at room temperature under nitrogen, and deaerated solvents were used.

1. Preparation of [Rh(nbd)Cl]$_2$

Bicyclo[2.2.1]hepta-2,5-diene (0.6 mL, 5.7 mmol) and rhodium(III) chloride hydrate (300 mg, 1.14 mmol) were added into ethanol (6 mL). The mixture was then refluxed for 3 hours. The reaction mixture was cooled to room temperature and the solid was collected by filtration and washed with ethanol (5 mL) for two times and hexane (5 mL) once. The orange crystalline solid was dried under vacuum at room temperature. Yield 50%.

2. Preparation of [Rh(cod)Cl]$_2$ 1,5-Cyclooctadiene (1 mL, 9.153 mmol) and rhodium(III) chloride hydrate (501.2 mg, 1.903 mmol) were added to ethanol (10 mL). The mixture was then refluxed for 3 hours. The solid, after cooled to room temperature, was filtered and washed with ethanol (5 mL) for two times and hexane (5 mL) once. Yellow crystalline solid was dried under vacuum at room temperature. Yield 75.5%.

3. Preparation of Rh(cod)(NH$_3$)Cl

Ammonium hydroxide (0.06 mL of 7.4N, 0.48 mmol) was added dropwisely to a solution of [Rh(cod)Cl]$_2$ (100 Mg, 0.2 mmol) in methanol (50 mL). The solution was then concentrated by evaporating solvent. Precipitate, obtained by adding small amount of water, was filtered and then washed with water (10 mL). The yellow solid was dried under vacuum. Yield 41%.

4. Preparation of Rh(cod)(t-BuNH$_2$)Cl t-butylaniine (0.016 mL, 0.15 mmol) was added to a solution of [Rh(cod)Cl]$_2$ in methylene chloride (2.1 mL). After the solvent was evaporated partially, the precipitate, which obtained by adding ether (10 mL) slowly, was filtered and dried under vacuum. Yield 30%.

5. Preparation of Rh(cod)(pip)Cl

Piperidine (0.017 g, 0.17 mmol) was added to a solution of [Rh(cod)Cl]$_2$ (38.9 mg, 0.79 mmol) in methylene chloride (2.5 mL). The solvent was partially evaporated in vacuo. The precipitate, formed on adding ether, was filtered off and washed with ether. Shiny yellow crystals were obtained. Yield 48%.

6. Preparation of Rh(cod)(mid)Cl

1-Methylimidazole (0.012 mL, 0.15 mmol) was added to a solution of [Rh(cod)Cl]$_2$ (35.3 mg, 0.72 mmol) in methylene chloride (2.5 mL). The solvent was partially evaporated in vacuo. The precipitate, formed on adding ether, was filtered off and washed with ether. Yellow crystals were obtained. Yield 65%.

7. Preparation of [Rh(cod)(mid)$_2$]PF$_6$

1-Methylimidazole (0.024 mL, 0.3 mmol) was added to the mixture of [Rh(cod)Cl]$_2$ (35.3 mg, 0.72 mmol), ethanol (1.4 mL) and water (0.7 mL). The precipitate, obtained by adding ammonium hexafluorophosphate, was filtered and washed by water. Yield 66%.

8. Preparation of (Rh(cod)Cl]$_2$(pda)

Freshly recrystallized o-phenylenediamine (18 mg, 0.166 mmol) was added to a solution of (Rh(cod)Cl]$_2$ (40 mg, 0.081 mmol) in methylene chloride (2 mL). The complex formed was filtered off and washed with ether. Yield 74%.

9. Preparation of [Rh(nbd)(H$_2$O)tos]

In 5 mL of water/ethanol were suspended 95 mg (0.21 mmol) of [Rh(nbd)Cl]$_2$ and silver p-toluenesulfonate (115 mg, 0.41 mmol) and the suspension was ultrasonicated for 3 min. A precipitate of AgCl and an orange solution formed. After filtration, the solution was evaporated to dryness in high vacuo. Slow diffusion of ether into an acetone solution gave yellow prisms. The solid was filtered and dried under vacuum. Yield 45%.

10. Preparation of Rh(cod)(H$_2$O)tos

In 10 mL of water/ethanol mixture were suspended 197 mg (0.40 mmol) of [Rh(cod)Cl]$_2$ and 223 mg (0.80 mmol) of silver p-toluenesulfonate. The suspension was ultrasonicated for 3 min. A precipitate of AgCl and an orange solution formed. After filtration, the solution was evaporated to dryness in vacuo. Slow diffusion of ether into an acetone solution of the crude product gave yellow prisms. Yield 65%.

F. Polymerization

1. Polymerization by Rhodium Complexes in Water Medium

Polymerizations were carried out in a pear-shape flask under nitrogen. Monomer was added into a suspension of the catalyst in water. After solid polymer formed, water layer was discarded. The polymer was dissolved in toluene and precipitated in methanol. The powdery polymer was filtered by sinter glass filter under normal gravity and dried to constant weight in a vacuum at room temperature.

a. Polymerization of Phenylacetylene by [Rh(cod)Cl]$_2$ in Aqueous Medium

Phenylacetylene (0.5 mL, 0.83 M) was added to the suspension of [Rh(cod)Cl]$_2$ (2 mg, 0.79 mM) in water (5 mL) and stirred vigorously at room temperature. Brownish-yellow solid, formed in 5 minutes, was obtained by removing water and then washed by acetone. The polymer was dissolved in toluene and precipitated in methanol. The polymer was filtered by sinter glass filter and dried to constant weight in a vacuum drying oven at room temperature. Yield 68.3%. $^1$H-NMR (CDCl$_3$) δ 5.84 (s, 1H, olefin proton), 6.62–6.64 (m, 2H, ortho) and 6.93–6.95 (m, 3H, meta and para), $^{13}$C-NMR (CDCl$_3$) δ 142.72 (quaternary carbon atoms of the chain), 138.16 (quaternary carbon atoms of benzene ring), 131.68 (olefinic carbon carrying hydrogen of the main chain), 127.63 (ortho), 127.40 (meta), and 126.54 (para).

2. Polymerization with Water-insoluble Rhodium Complexes in Organic Medium

Polymerizations were carried out in a pear-shape flask under nitrogen. Catalyst was dissolved in organic solvent, monomer was added into the catalyst solution. A mixture of toluene/methanol (20:1 v/v) was added to terminate the polymerization. Polymer, precipitated in methanol, was filtered by sinter glass filter and dried to constant weight under vacuum at room temperature.

a. Polymerization of Phenylacetylene with [Rh(cod)Cl]$_2$ in THF

Phenylacetylene (0.5 mL, 0.83 M) was added to the solution of [Rh(cod)Cl]$_2$ (2 mg, 0.79 mM) in THF (5 mL) and stirred at room temperature. A mixture of toluene/methanol (20:1 v/v) was added to terminate the polymerization. Polymer, precipitated in methanol, was filtered by sintered glass filter and dried under vacuum at room temperature until constant weight was obtained. Yield 69.1 %. $^1$H-NMR (CDCl$_3$) δ 5.84 (s, 1H, olefin proton), 6.62–6.64 (m, 2H, ortho) and 6.93–6.95 (m, 3H, meta and para), $^{13}$C-NMR (CDCl$_3$) δ 142.72 (quaternary carbon atoms of the chain), 138.16 (quaternary carbon atoms of benzene ring), 131.63 (olefinic carbon carrying hydrogen of the main chain), 127.63 (ortho), 127.40 (meta), and 126.54 (para).

3. Polymerization by Catalysts in Water

Polymerizations were carried out in a pear-shape flask under nitrogen. Catalyst was dissolved in water, monomer was added into the catalyst solution. Distilled water was taken out after solid polymer formed. The polymer, dried under vacuum to constant weight, was dissolved in THF and precipitated in methanol. The polymer was filtered by sinter glass filter and dried to constant weight in a vacuum oven at room temperature.

a. Polymerization of Phenylacetylene by [Rh(cod)(H$_2$O) tos] in Aqueous Medium

Phenylacetylene (0.5 ml, 0.83 M) was added into a catalyst solution of (Rh(cod)(H$_2$O)tos] (2 mg, 0.98 mM) in water (5 mL) and stirred at room temperature. Brownish-yellow solid was formed in 5 minutes. All the water and catalyst was removed and the solid polymer was washed by acetone. The polymer was dissolved in toluene and precipitated in methanol. The polymer was filtered by sinter glass filter and dried to constant weight in a vacuum oven at room temperature. Yield 81.9%. $^1$H-NMR (CDCl$_2$) δ 5.84 (s, 1H, olefin proton), 6.62–6.64 (m, 2H, ortho) and 6.93–6.95 (m, 3H, meta and para), $^{13}$C-NMR (CDCl$_3$) δ 142.72 (quaternary carbon atoms of the chain), 138.16 (quaternary carbon atoms of benzene ring), 131.68 (olefinic carbon carrying hydrogen of the main chain), 127.63 (ortho), 127.40 (meta), and 126.54 (para).

4. Polymerization by Water Soluble Catalysts in Toluene or THF

Polymerization was carried out in a Schlenk tube under nitrogen. The catalyst was added into the Schlenk tube and flushed with nitrogen. Dry toluene or THF and degassed monomer was added into the catalyst solution and stirred. Polymerization was quenched with toluene/methanol (volume ratio, 20:1 v/v) mixture and the polymer was precipitated into methanol. The polymer was filtered by sinter glass filter and dried to constant weight in a vacuum oven at room temperature.

a. Polymerization of Phenylacetylene by [Rh(cod)(H$_2$O) tos] in THF

Phenylacetylene (0.5 ml, 0.83 M) was added into a catalyst solution of [Rh(cod)(H$_2$O)tos] (2 mg, 0.98 mM) in THF (5 mL) and stirred at room temperature. A mixture of toluene/methanol (20:1 v/v) was added to terminate the polymerization. Polymer, precipitated in methanol, was filtered by sinter glass filter and dried to a constant weight in vacuum drying oven at room temperature. Yield 70.3%. $^1$H-NMR (CDCl$_3$) δ 5.84 (s, 1H, olefin proton), 6.62–6.64 (m, 2H, ortho) and 6.93–6.95 (m, 3H, meta and para), $^{13}$C-NMR (CDCl$_3$) δ 142.72 (quaternary carbon atoms of the chain), 138.16 (quaternary carbon atoms of benzene ring), 131.68 (olefin carbon carrying hydrogen of the main chain), 127.63 (ortho), 127.40 (meta), and 126.54 (para).

5. Membrane Preparation on Water

Phenylacetylene (1 drop) was put on the surface of a water solution (10 mL) of the water-soluble rhodium catalyst (2 mg). Membrane was formed in several seconds. The membrane was taken out and washed by water. The polymer membrane was dried to constant weight in a vacuum drying oven at room temperature. $^1$H-NMR (CDCl$_3$) δ 5.84 (s, 1H, olefin proton), 6.62–6.64 (m, 2H, ortho) and 6.93–6.95 (m, 3H, meta and para), $^{13}$C-NMR (CDCl$_3$) δ 142.72 (quaternary carbon atoms of the chain), 138.16 (quaternary carbon atoms of benzene ring), 131.68 (olefin carbon carrying hydrogen of the main chain), 127.63 (ortho), 127.40 (meta), and 126.54 (para).

These and other embodiments of the present invention will be apparent to one of ordinary skill in the art in view of the foregoing disclosure and examples.

What we claim is:

1. A method for forming highly stereoregular polyacetylenes comprising combining in an aqueous water solvent:

a. a rhodium complex having a diene ligand, said complex being selected from the group consisting of Rh(diene) L, Rh(diene)(cl) L, [Rh(diene) L]$^+$A$^-$, where L is a nitrogen-containing ligand and A is an anion, and Rh(diene)(H2O)L where L is toluenesulfonate; and b. an acetylenic monomer.

2. The method of claim 1, wherein the rhodium complex is selected from among the types: Rh(diene)X; Rh(diene)R (H$_2$O); Rh(diene)NR; and Rh(diene)NR—X, wherein X is a halogen, R is an acyl, alkyl, or aryl substituent of 20 carbons or fewer, and NR is ammonia or substituted ammonia.

3. The method of claim 1, wherein the rhodium complex is selected from among the group consisting of: Rh(nbd) (tos)(H$_2$O); Rh(cod)(tos)(H$_2$O); [Rh(nbd)Cl]$_2$; [Rh(cod) Cl]$_2$; Rh(cod)(bis(4-t-butyl)-2-pyridylmethylthiolate); Rh(cod)(piperidine)Cl; Rh(cod)(NH$_3$)Cl; Rh(cod)(t-BuNH$_3$)Cl; Rh(cod)(N-methylimidazole)Cl; [Rh(cod)(N- methylimidazole)$_2$]$^+$PF$_6$—; and [Rh(cod)Cl]$_2$(ortho-phenylenediamine).

4. The method of claim 1, wherein the acetylenic monomer is a hydrocarbon-substituted acetylene.

5. The method of claim 4, wherein the hydrocarbon-substituted acetylenic monomer is either phenylacetylene or para-methylphenylacetylene.

6. A method for forming poly(phenylacetylenes) comprising combining in an aqueous solvent:
   a. a rhodium complex comprising a diene ligand and a halogen ligand; and
   b. a phenylacetylenic monomer.

7. A method for forming poly(phenylacetylenes) comprising combining in an aqueous solvent:
   a. a rhodium complex comprising a diene ligand and a nitrogen-containing ligand; and
   b. a phenylacetylenic monomer.

8. A method for forming highly stereoregular poly(phenylacetylenes) comprising combining in an aqueous solvent:
   a. a rhodium complex selected from the group consisting of Rh(nbd)(tos)(H$_2$O), Rh(cod)(tos)(H$_2$O), [Rh(nbd)Cl]$_2$, and [Rh(cod)Cl]$_2$; and
   b. a substituted acetylenic monomer selected from the group consisting of phenylacetylene and (para-methylphenyl)acetylene.

9. A method for forming highly stereoregular poly(phenylacetylenes) comprising combining:
   a. a rhodium complex selected from the group consisting of (Rh(cod)Cl]$_2$ and [Rh(nbd)Cl]$_2$; and
   b. a substituted acetylenic monomer selected from the group consisting of phenylacetylene and (para-methylphenyl)acetylene in a solvent mixture comprising toluene and a polar solvent.

10. A method for forming thin polyacetylene films comprising contacting a substituted acetylenic monomer solution with an aqueous solution containing a water soluble rhodium catalyst.

11. The method of claim 10, wherein said thin film is formed by adding a discrete quantity of the substituted acetylenic monomer solution to the surface of said aqueous solution in air.

12. The method of claim 10, wherein said substituted acetylenic monomer is selected from the group consisting of phenyl acetylene and (para-methylphenyl)acetylene.

13. The method of claim 10, wherein the rhodium catalyst is selected from the group consisting of Rh(nbd)(tos)(H$_2$O); Rh(cod)(tos)(H$_2$O); [Rh(nbd)Cl]$_2$; and [Rh(cod)Cl]$_2$.

14. A method for forming thin polyacetylene films comprising contacting a solution of an acetylenic monomer, said monomer selected from the group consisting of phenyl acetylene and (para-methylphenyl)acetylene, with an aqueous solution containing a water soluble rhodium catalyst selected from the group consisting of Rh(nbd)(tos)(H$_2$O); Rh(cod)(tos)(H$_2$O).

15. A method for forming highly stereoregular poly(phenylacetylenes) comprising combining:
   a. a rhodium complex comprising a diene ligand; and
   b. a mono-substituted acetylenic monomer in a solvent mixture comprising toluene and a polar solvent, wherein the polar solvent is methanol.

* * * * *